UNITED STATES PATENT OFFICE 2,273,323

ACCELERATOR OF VULCANIZATION

Paul C. Jones, Akron, Ohio, assignor to The B. F. Goodrich Company, New York, N. Y., a corporation of New York No Drawing. Application May 21, 1940,
Serial No. 336,397

6 Claims. (Cl. 260—306)

This invention relates to the art of rubber manufacture, and has as its chief object to provide a new and improved class of accelerators of vulcanization.

I have discovered that thioamines having the structural formula

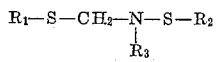

wherein $R_1$ and $R_2$ represent members of the class consisting of thiazyl and thiazolinyl groups and $R_3$ represents an aliphatic group are excellent accelerators of vulcanization.

These compounds may be prepared by reacting, with elimination of water, a thiomethylene hydrin of a thiazole or a thiazoline with a sulfene amide containing a hydrogen on the nitrogen. Thus 2-benzothiazyl hydroxymethyl sulfide and 2-benzothiazyl N-cyclohexyl sulfene amide were reacted to form cyclohexyl 2-benzothiazylthiomethyl 2-benzothiazylthio amine according to the following equation:

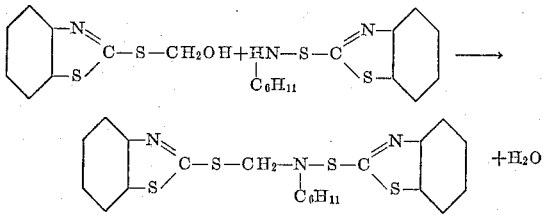

Instead of the benzothiazyl group, $R_1$ and $R_2$ may represent thiazyl or thiazolinyl groups such as 6-nitrobenzothiazyl, toluothiazyl, naphthothiazyl, 4,5-dimethylthiazyl, 4-ethylthiazyl, 4-phenylthiazyl, 4,4-dimethylthiazyl, thiazolinyl, 4-methylthiazolinyl, etc. $R_3$ may represent any aliphatic group, including straight-chain alkyl, aralkyl, and cycloalkyl groups such as methyl, ethyl, isopropyl, butyl, allyl, isocrotyl, benzyl, cyclopentyl, cycloheptyl, etc.

As a specific example of this invention, the following compositions were prepared:

| | Composition | |
|---|---|---|
| | A | B |
| Rubber | 100 | 100 |
| Zinc oxide | 5 | 5 |
| Sulfur | 3.5 | 3.5 |
| Cyclohexyl 2-benzothiazylthiomethyl 2-benzothiazylthio amine | 1.0 | 0 |
| Cyclohexyl 2-thiazolinylthiomethyl 2-benzothiazylthio amine | 0 | 1.0 |

When these compositions were vulcanized for 15 min. at 287° F., compositions having the following characteristics were obtained, T representing tensile strength in lbs./in.$^2$ and E representing ultimate elongation in per cent.

| Composition | T | E |
|---|---|---|
| 1 | 3,740 | 690 |
| 2 | 3,810 | 705 |

As will be observed, it is unnecessary to employ fatty acids to activate the accelerators of this invention, although fatty acids may be present if desired.

It is to be understood that the specific examples given above are merely illustrative of one manner of the use of the accelerators of this invention; that other accelerators within the scope of the class herein defined may be substituted for the specific compounds used in the examples; that the accelerators of this invention may be used to vulcanize rubber broadly, including caoutchouc, balata, gutta percha, synthetic rubber, or natural or artificially prepared latex; that the accelerators may be incorporated in the rubber by mastication or milling, or in the case of latex or other dispersion or solution, by simply dissolving or suspending the accelerator therein; that the accelerators may be used in admixture with each other or with other known accelerators or with antioxidants, organic acids, amines, softeners, activators, retarders, pigments, fillers, etc.; and that the rubber may be vulcanized with the assistance of this new class of accelerators in heated molds, hot air, steam, hot water, etc. The accelerators of this invention may advantageously be used in as low a proportion as 0.05% of the rubber in the composition, in which case 3 to 5% of sulfur is generally required, or as high as 5%, with a much reduced quantity of sulfur.

This invention is accordingly not limited to the specific examples herein set forth, for it will be obvious to those skilled in the art that many modifications such as using other materials having equivalent properties and varying the proportions of materials used are within the spirit and scope of the invention as defined in the appended claims.

I claim:

1. Compounds having the structural formula

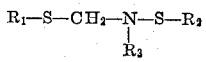

wherein $R_1$ and $R_2$ represent members of the class consisting of 2-thiazyl and 2-thiazolinyl groups, and R₃ represents an aliphatic group.

2. Compounds having the structural formula

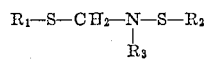

wherein R₁ represents a 2-thiazolinyl group, R₂ represents a 2-thiazyl group, and R₃ represents an aliphatic group.

3. Compounds having the structural formula

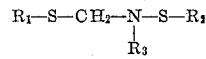

wherein R₁ and R₂ represent 2-thiazyl groups and R₃ represents an aliphatic group.

4. Compounds having the structural formula

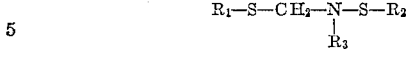

wherein R₁ represents a 2-thiazolinyl group, R₂ represents the 2-benzothiazyl group, and R₃ represents the cyclohexyl group.

5. Cyclohexyl 2-thiazolinylthiomethyl 2-benzothiazylthio amine.

6. Cyclohexyl 2-benzothiazylthiomethyl 2-benzothiazylthio amine.

PAUL C. JONES.